UNITED STATES PATENT OFFICE.

GEORGE W. WHITE, OF FORT WORTH, TEXAS.

MEDICAL COMPOUND.

SPECIFICATION forming part of Letters Patent No. 460,611, dated October 6, 1891.

Application filed November 7, 1890. Serial No. 370,688. (No specimens.)

*To all whom it may concern:*

Be it known that I, GEORGE W. WHITE, a citizen of the United States, residing at Fort Worth, in the county of Tarrant and State of Texas, have invented a new and useful Medical Compound, of which the following is a specification.

My invention relates to an improvement in medicinal preparations, and it is especially adapted for use in yellow fever, chills and fever, diphtheria, all throat and lung diseases, small-pox, kidney diseases, dropsy, and catarrh of the head and womb.

The compound consists, principally, of the extracts of the herbs of Mexican sarsaparilla and broom-sage, (*Artemisia tridentata*,) while the additions of sugar and alcohol complete the tonic desired. By leaving off the sugar and alcohol and adding, in certain proportions to the reduced extracts, "deusaline," a certain product of petroleum, a form of the compound is formed that is specially applicable to the treatment of catarrh alone.

Deusaline is a product of petroleum of the same character as amber petrolatum, which is well known to be a product from the residuum left in the petroleum-stills and comes off together with the substances petrolina, deodoroline, &c., and is only preferred as a vehicle in lieu of petrolatum and the substances of the same class just mentioned.

The ingredients are mixed together in the following proportions: to one gallon of the extract of the herbs of Mexican sarsaparilla and broom-sage weed (*Artemisia tridentata*) I add sugar, one pound, and alcohol, one-half pint, and in the other form of the compound to one pint of the reduced extract of the two herbs I add one pound of deusaline.

In the preparation of the above compound I first make the extract from the two herbs by a process of distillation which consists in placing the herbs together in a steam-box which is provided with a top that incloses the same after the herbs are placed therein, and then subjecting the same to the action of steam, which is admitted at the bottom of the box, which causes the extract to commence to run from the herbs, and of course is then drawn off from the steam-chest. When the extract is prepared, I then add the sugar, place the mixture in a kettle, and bring the same to a boil. After completely straining the boiled mixture through a suitable straining medium I then add the alcohol to the same and it is ready for use. The extract of the two herbs is reduced before the addition of the deusaline.

The dose is one table-spoonful from three to five times a day for adults and one-half of the above dose for children.

Having thus described my invention, what I claim, and desire to secure by Letters Patent, is—

1. A medical compound composed of the extracts of Mexican sarsaparilla and broom-sage (*Artemisia tridentata*) and a suitable vehicle, combined in substantially the proportions specified.

2. A medical compound composed of the extracts of Mexican sarsaparilla and broom-sage, (*Scoparius*,) alcohol, and sugar, combined in substantially the proportions specified.

In testimony that I claim the foregoing as my own I have hereto affixed my signature in presence of two witnesses.

GEORGE W. WHITE.

Witnesses:
D. F. WHITE,
W. L. BLEDSOE.